United States Patent
Mateer et al.

(10) Patent No.: US 10,601,927 B1
(45) Date of Patent: *Mar. 24, 2020

(54) CONTEXT AWARE TRANSACTIONS

(71) Applicant: West Corporation, Omaha, NE (US)

(72) Inventors: Michael T. Mateer, Omaha, NE (US);
James K. Boutcher, Omaha, NE (US);
Jesse Andersen, San Francisco, CA (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/043,266

(22) Filed: Jul. 24, 2018

Related U.S. Application Data

(63) Continuation of application No. 13/273,393, filed on Oct. 14, 2011, now Pat. No. 10,033,815.

(51) Int. Cl.
*H04L 29/08* (2006.01)

(52) U.S. Cl.
CPC .................... *H04L 67/14* (2013.01)

(58) Field of Classification Search
CPC ...................................... H04L 67/14
USPC .......................................... 709/227
See application file for complete search history.

(56) References Cited

U.S. PATENT DOCUMENTS

| 8,839,288 B2* | 9/2014 | Morris | H04N 21/4126 |
| | | | 725/10 |
| 10,033,815 B1* | 7/2018 | Mateer | H04L 67/14 |
| 2008/0183645 A1* | 7/2008 | Burger | H04L 67/1095 |
| | | | 706/12 |
| 2008/0317000 A1* | 12/2008 | Jackson | H04L 65/1016 |
| | | | 370/352 |
| 2009/0138606 A1* | 5/2009 | Moran | H04L 67/14 |
| | | | 709/227 |
| 2013/0006874 A1* | 1/2013 | Klemm | G06Q 30/02 |
| | | | 705/304 |

* cited by examiner

*Primary Examiner* — Sm A Rahman
*Assistant Examiner* — Emad Siddiqi

(57) ABSTRACT

Certain aspects of the present disclosure relate to a technique for configuring context aware sessions. A first session is provided using a first communication channel Contextual information of the first session is used to provide a second session using a second communication channel, wherein the second session is associated with the first session.

20 Claims, 3 Drawing Sheets

CONTEXT AWARE TRANSACTIONS

CROSS-REFERENCE TO RELATED APPLICATIONS

This application is a continuation from U.S. patent application Ser. No. 13/273,393, filed Oct. 14, 2011, and entitled "CONTEXT AWARE TRANSACTIONS", which is incorporated by reference herein in its entirety.

FIELD OF THE INVENTION

The present disclosure relates generally to communication systems and, more specifically, to a method, apparatus and computer-readable instructions configuring context aware transactions.

BACKGROUND OF THE INVENTION

Several systems are available that provide services to users which are typically accessible using various communication channels. These services may include one or more web services and the communication channels may include audio call, short message service (SMS), web, mobile and social media. The user may typically use several of the channels to access multiple of the services for carrying out a same or related tasks. The user may frequently need to carry out multiple sessions related to a same task or related tasks using multiple services by way of different communication channels. For example, the user may need to switch from a first session using a first service accessible via a first communication channel to a second session using a second service accessible via a second communication channel. In such scenarios, the current systems typically drop the user's context for the first session and initiate a completely new context for the second session. Without a context from the first session, the second service may need to collect user all over again before being able to provide the required solution to the user. This information may include user account information, user request and the like. This may lead to the user needing to start all over again on every new session which is very inefficient and may lead to loss of time, system resources, increased cost of running the system and user dissatisfaction.

Thus there is a need for efficiently processing multiple user sessions related to a same task or related tasks using multiple services accessible using multiple communication channels.

SUMMARY OF THE INVENTION

Certain aspects of the present disclosure provide a method for configuring context aware sessions. The method generally includes providing a first session using a first communication channel and using contextual information of the first session to provide a second session using a second communication channel, wherein the second session is associated with the first session.

Certain aspects of the present disclosure provide an apparatus for configuring context aware sessions. The apparatus generally includes at least one processor configured to provide a first session using a first communication channel and use contextual information of the first session to provide a second session using a second communication channel, wherein the second session is associated with the first session; and a memory coupled to the at least one processor.

Certain aspects of the present disclosure provide a computer-program product for configuring context aware sessions, the computer-program product generally includes a non-transitory computer-program product for configuring context aware sessions, the computer-program product comprising instructions for providing a first session using a first communication channel and using contextual information of the first session to provide a second session using a second communication channel, wherein the second session is associated with the first session.

Figure 1:
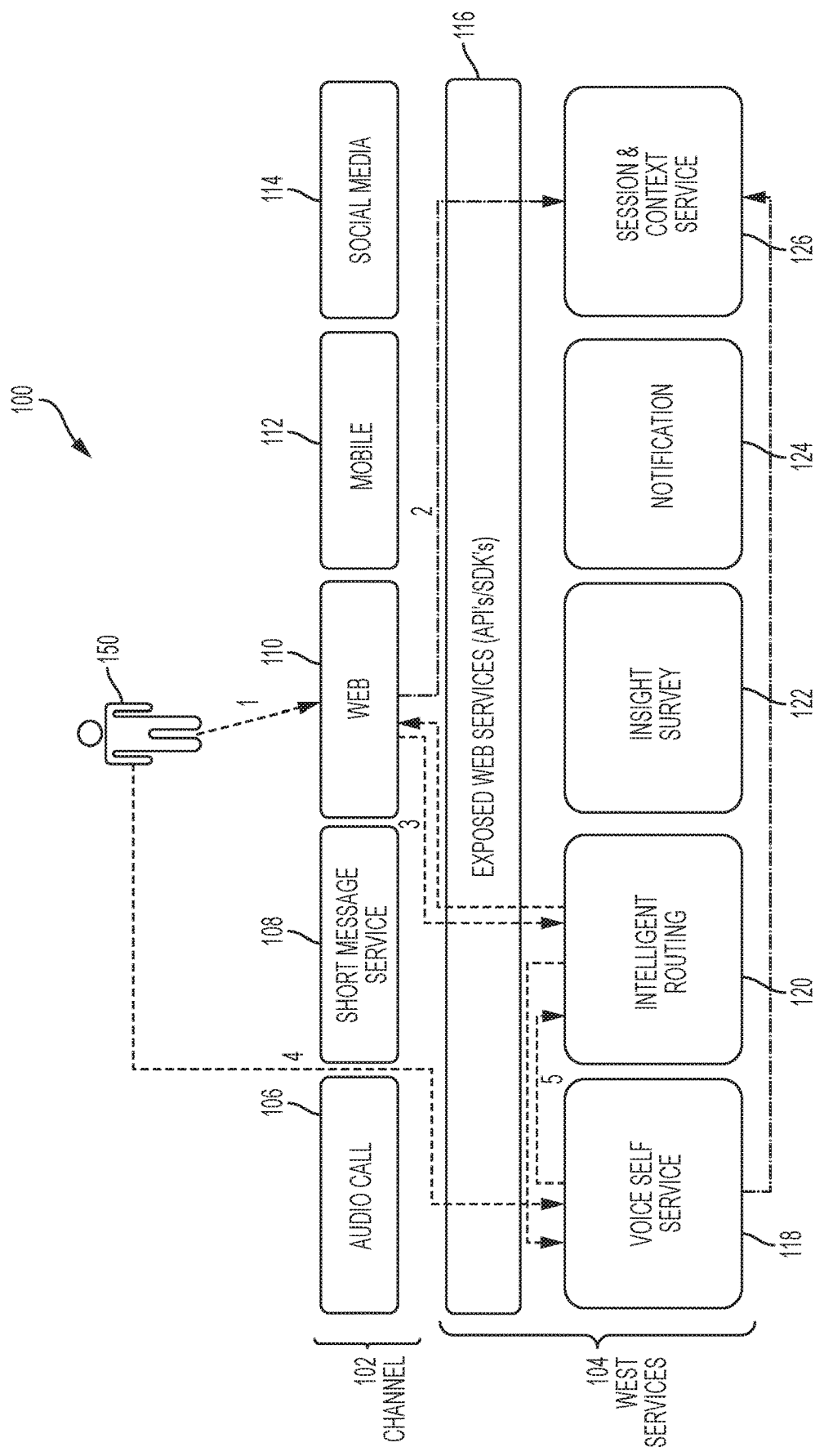
FIG. 1 is a block diagram of a communications system conceptually illustrating an example of context aware sessions in accordance with certain aspects of the present disclosure.

The foregoing summary, as well as the following detailed description of certain embodiments of the present invention, will be better understood when read in conjunction with the appended drawings. The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION OF THE INVENTION

FIG. 1 is a block diagram of a communications system 100 conceptually illustrating an example of context aware sessions in accordance with certain aspects of the present disclosure.

System 100 provides services 104 to user 150 which are accessible using various communication channels 102. Services 104 include voice self service 118, intelligent routing service 120, insight survey service 122, notification service 124 and session and context service 126. Communication channels 102 include audio calls 106, short message service 108, web 110, mobile 112 and social media 114. System 100 may also include an interface service 116 providing an interface between the communication channels 102 and the services 104. It may be appreciated that the communication channels 102 and services 104 shown as part of the system 100 are only by way of an illustrative example and the system 100 may include any number and types of communication channels and services. For example, services 104 may include any one or more web services or applications and the communication channels may include any channel that may be used for communication between a user and the services.

The user 150 may typically use several of the channels 102, one or more at a time, to access one or more of the services 104 for carrying out sessions related typically to a same task or related tasks. The user 150 may frequently need to carry out multiple sessions related to the same task or related tasks using multiple services 104 by way of different communication channels 102. For example, the user may need to switch from a first session using a first service accessible via a first communication channel to a second session using a second service accessible via a second communication channel. In an aspect, the user 150 may access one or more of the services 104 using one or more communication channels 102.

In an aspect, the session and context service 126 records contextual information for every user session, typically in real time. The intelligent routing service 120 is responsible for transferring user context from one channel/service to another channel/service. The contextual information may include user account information, user events during a session, user requests made during a session and the like. Thus, system 100 provides context aware transactions with an ability to pickup where the user left a session or transaction no matter what communication channel 102 the user may use.

FIG. 1 illustrates an example scenario, wherein the user 150 uses system 100 for initiating two sessions for carrying out related tasks. For example, at step 1 the user 150 is interfacing with a client's website in a first session to try and order a "Pay Per View" movie. At step 2, while the user 150 is navigating the website, contextual information relating to the first session is constantly being sent to the Session & Context Service 126.

At step 3 the user 150 needs assistance. For the sake of this example the user may hit a "Click to Call" button on the web page during the first session. This sends a message to the intelligent routing service 120 with collected user data and contextual information from the first session relating to for example what the user 150 was trying to do. In certain aspects, an 8YY number is returned to the user that happens to be provisioned to hit a Voice Self Service (VSS) Platform 118.

At step 4, when the user's call hits the Voice Self Service 118, the Platform notifies the intelligent routing service 120 of the call arrival.

At step 5, the intelligent routing service 120 returns the user data and previous channel context from the first session to the VSS application. The application then picks up where the website left off and processes the "Pay Per View" transaction in a second session using the contextual information from the first session.

At step 6, while the user 150 is navigating through the VSS application constant contextual information relating to the second session is sent to the session & context service 126.

At this point the user 150 may be serviced via automated VSS application or if the user is still having difficulty the he may select Help within the VSS application and the application may send an agent request message to the intelligent routing service 120 and another 8YY number may be returned to the user 150 that is targeted for a specific contact center or Agent. The customer data and context information from the second session may then be passed to the agent and the a third session may be initiated between the user and the agent and the user may pick up where he left in the second session.

In certain aspects Natural Language Processing is a service that may be used with ASR, SMS, and Social Media and decisions/interactions may be automated for these communication channels 102 and context information stored in the session and context service 126.

Figure 2:
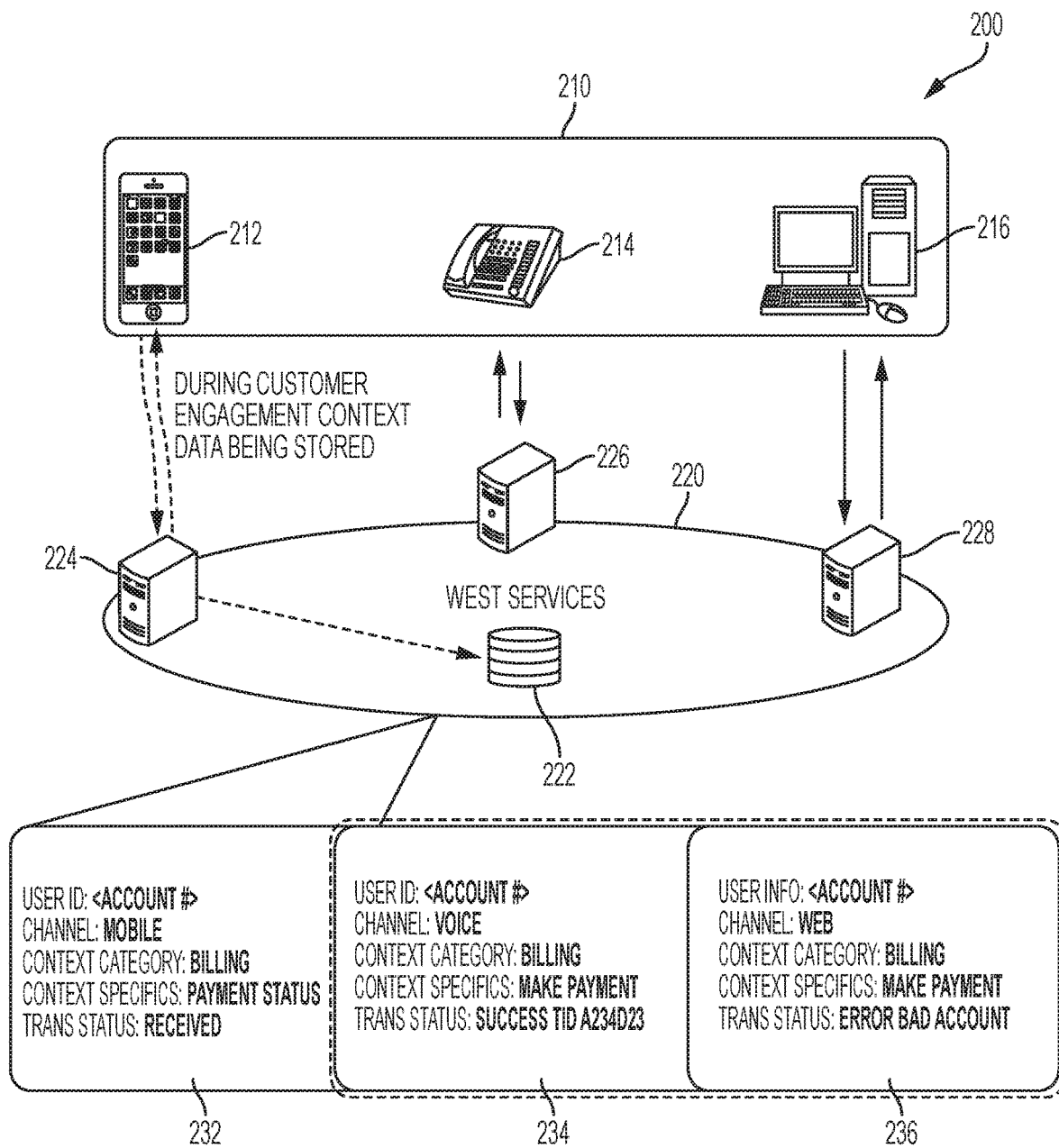
FIG. 2 is a block diagram of a communication system conceptually illustrating an example of multi channel context aware transactions in accordance with certain aspects of the present disclosure.

FIG. 2 is a block diagram of a communication system 200 conceptually illustrating an example of multi channel context aware transactions in accordance with certain aspects of the present disclosure.

System 200 includes multiple communication channels 210 including mobile 212, fixed line 214 and computer 216. The system 200 also provides multiple services 220 such as services 222, 224, 226 and 228. The services 220 may be a web service or any other type of service. Service 222 is a session and context service for recording user data and contextual information from user sessions. In system 200, service 224 is accessible via mobile 212, service 236 is accessible via fixed line 214 and service 228 is accessible via computer 216.

FIG. 2 illustrates an example of a user undertaking multiple sessions using the various communication channels 210 available for making a payment for a bill. The user first initiates a first session on the web with the service 228 using the computer 216 as communication channel. While the user tries to access his account and pay the bill, user data and context information relating to the first session is constantly sent and stored in the session and context service 222.

When the user fails to pay the bill using the first session, the user initiates a second session with the service 226 using the fixed line 214 as the communication channel. When the user's call arrives into the system using the fixed line 214, the user is authenticated and context data is searched. In an aspect, the user may be prompted to enter an account number and any existing (stored) user context information may be searched for in the service 222 using the user account number. The context data from the first session is retrieved from service 222 and used for setting up the second session. As the user proceeds in the second session and successfully pays the bill, the context information relating to the second session is constantly sent and stored in service 222.

The user may initiate a third session with service 224 using mobile 212 as the communication channel to check a status of the bill payment. Again when a mobile call is received into the system 200, the user is authenticated and context data is searched in service 222 similar to the second session above. The user context data from the second session is retrieved from service 222 and used for setting up the third session and the user is promptly sent a notification on the mobile device 212 that the bill payment is received.

Figure 3:
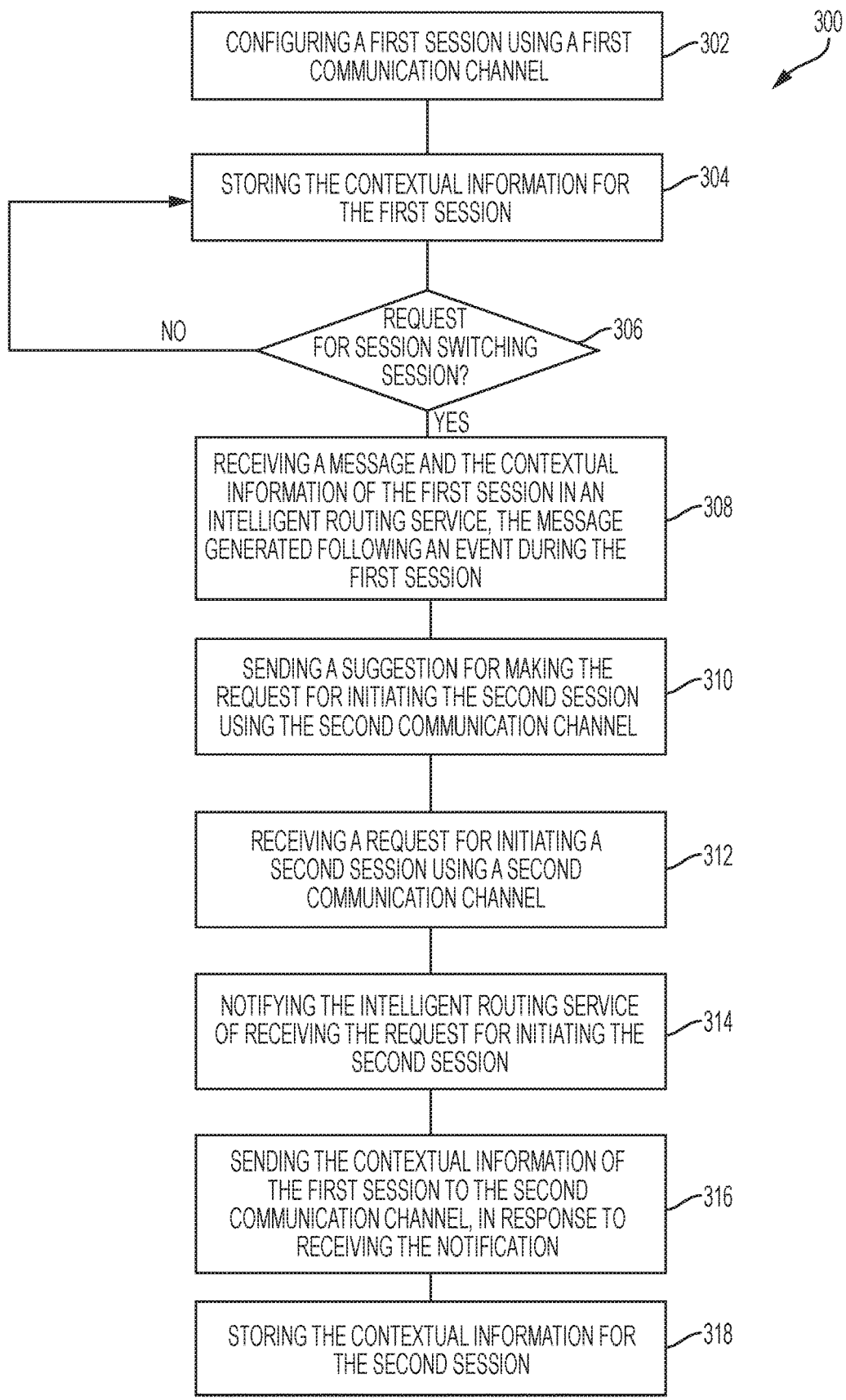
FIG. 3 illustrates example operations for multi-channel context aware session in accordance with certain aspects of the present disclosure.

FIG. 3 illustrates example operations 300 for multi-channel context aware session in accordance with certain aspects of the present disclosure. Operations 300 begin at 302 by providing a first session to a user using a first communication channel. In certain aspects the first session may be provided with a first service using the first communication channel. At 304, contextual information of the first session is stored typically in by a session and context service. At 306, if a request for switching sessions is not received the process moves back to 304. If a request for switching sessions is received at 306, the process proceeds to 308 where a message and the contextual information of the first session is received in an intelligent routing service, the message typically generated following an event during the first session. The event may be as simple as clicking a hyperlink on a web page during the first session.

At 310, a suggestion for making the request for initiating the second session using the second communication channel is sent typically from the intelligent routing service to the user. At 312, a request for initiating a second session using a second communication channel is received in the system. In certain aspects, the request for initiating the second session is received at a second service. At 314, the intelligent routing service is notified of receiving the request for initiating the second session at the second service. At 316, contextual information of the first session is sent by the intelligent routing service to the second communication channel, in response to receiving the notification. At 318, contextual information for the second session is stored by the session and context service.

The user data denoted herein are attributes that identify the user directly or indirectly and provides details on what the user was doing or attempting to do. This data is sent to the context services every time the user enters data. The type of data can be segregated whereby only key data is stored in or with the context service. The session and context service 222 is a centralized database accessible by any of the services.

A Wi-Fi or Internet Protocol Television application may initiate service with the context service DB 222 via an application resident on or utilized by a Wi-Fi or Internet Protocol Television. Such an application may be created via APIs or SDKs provided by TV manufactures, ISPs, service providers and the like. The APIs and SDKs allow any party (including third parties) to access such information via the APIs/SDKs that can be exposed externally as a Data as a Service (DaaS) that is integrated into the end devices applications. Predictive transactions could include paying a bill, ordering a movie, voting or polling, and the like.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method, comprising:
    logging online user activity history conducted over a first session and a first communication channel;
    automatically identifying, via an intelligent routing service, a need to create a new session by a user;
    sending, via the intelligent routing service, a suggestion to the user to send a request to initiate a new session;

receiving, via the intelligent routing service, the request to initiate a new session from the user;
transmitting contextual information conducted over the first session and the first communication channel to the intelligent routing service;
transmitting the contextual information from the intelligent routing service to a second communication channel and a service application responsive to receiving the request, wherein the contextual information comprises user credentials and at least one user selection made during the first session; and
receiving a call associated with the second communication channel;
responsive to receiving the call, authenticating the user credentials and searching the contextual data from the first session; and
using the contextual information of the first session to create the new session using the second communication channel, wherein the new session is associated with an online content selection included in the online user activity history.

2. The method of claim 1, further comprising storing the contextual information for the first session.

3. The method of claim 2, further comprising:
receiving the request for creating the new session using the second communication channel; and
sending the contextual information of the first session to the second communication channel.

4. The method of claim 3, further comprising receiving a message and the contextual information of the first session in the intelligent routing service, the message generated following an event during the first session.

5. The method of claim 4, further comprising:
notifying the intelligent routing service of receiving the request for creating the new session;
sending the contextual information of the first session to the second communication channel, in response to receiving the notification.

6. The method of claim 5 further comprising storing the contextual information for the new session.

7. The method of claim 1, wherein the first session is executed using a first service and the new session is executed using a second service.

8. An apparatus, comprising:
at least one processor configured to:
log online user activity history conducted over a first session and a first communication channel;
automatically identify, via an intelligent routing service, a need to create a new session by a user;
send, via the intelligent routing service, a suggestion to the user to send a request to initiate a new session;
receive, via the intelligent routing service, the request to initiate a new session from the use;
transmit contextual information conducted over the first session and the first communication channel to the intelligent routing service;
a receiver configured to receive a call associated with the second communication channel;
responsive to a receipt of the call, authenticate the user credentials and search the contextual data from the first session;
use the contextual information of the first session to create the new session using the second communication channel, wherein the new session is associated with the online user activity history; and
a transmitter configured to transmit the contextual information from the intelligent routing service to the second communication channel and a service application responsive to a receipt of the request, wherein the contextual information comprises user credentials and at least one user selection made during the first session; and
a memory coupled to the at least one processor.

9. The apparatus of claim 8, wherein the at least one processor is further configured to store the contextual information for the first session.

10. The apparatus of claim 9, wherein the at least one processor is further configured to:
receive the request for creation of the new session using the second communication channel; and
send the contextual information of the first session to the second communication channel.

11. The apparatus of claim 10, wherein the at least one processor is further configured to receive a message and the contextual information of the first session in the intelligent routing service, the message generated following an event during the first session.

12. The apparatus of claim 11, wherein the at least one processor is further configured to:
notify the intelligent routing service of receipt of the request to create the new session;
send the contextual information of the first session to the second communication channel, in response to receipt of the notification.

13. The apparatus of claim 12 wherein the at least one processor is further configured to store the contextual information for the new session.

14. The apparatus of claim 8, wherein the first session is executed using a first service and the new session is executed using a second service.

15. A non-transitory computer-program product comprising one or more instructions for:
logging online user activity history conducted over a first session and a first communication channel;
automatically identifying, via an intelligent routing service, a need to create a new session by a user;
sending, via the intelligent routing service, a suggestion to the user to send a request to initiate a new session;
receiving, via the intelligent routing service, the request to initiate a new session from the user;
transmitting contextual information conducted over the first session and the first communication channel to the intelligent routing service;
transmitting the contextual information from the intelligent routing service to a second communication channel and a service application responsive to receiving the request, wherein the contextual information comprises user credentials and at least one user selection made during the first session;
receiving a call associated with the second communication channel;
responsive to receiving the call, authenticating the user credentials and searching the contextual data from the first session; and
using the contextual information of the first session to create the new session using the second communication channel, wherein the new session is associated with an online content selection included in the online user activity history.

16. The non-transitory computer-program product of claim 15, further comprising one or more instructions for storing the contextual information for the first session.

17. The non-transitory computer-program product of claim 16, further comprising one or more instructions for:

receiving the request for creating the new session using the second communication channel; and sending the contextual information of the first session to the second communication channel.

18. The non-transitory computer-program product of claim 17, further comprising one or more instructions for receiving a message and the contextual information of the first session in the intelligent routing service, the message generated following an event during the first session.

19. The non-transitory computer-program product of claim 18, further comprising one or more instructions for:

notifying the intelligent routing service of receiving the request for creating the new session;

sending the contextual information of the first session to the second communication channel, in response to receiving the notification.

20. The non-transitory computer-program product of claim 19, further comprising one or more instructions for storing the contextual information for the new session.

* * * * *